M. R. BRUNER.
TRACTION DEVICE.
APPLICATION FILED AUG. 16, 1911.

1,123,238.

Patented Jan. 5, 1915.
3 SHEETS—SHEET 2.

WITNESSES:
Wm F Doyle
Parker Cook

INVENTOR
Martin R Bruner
by
A.P. Greeley
Attorney

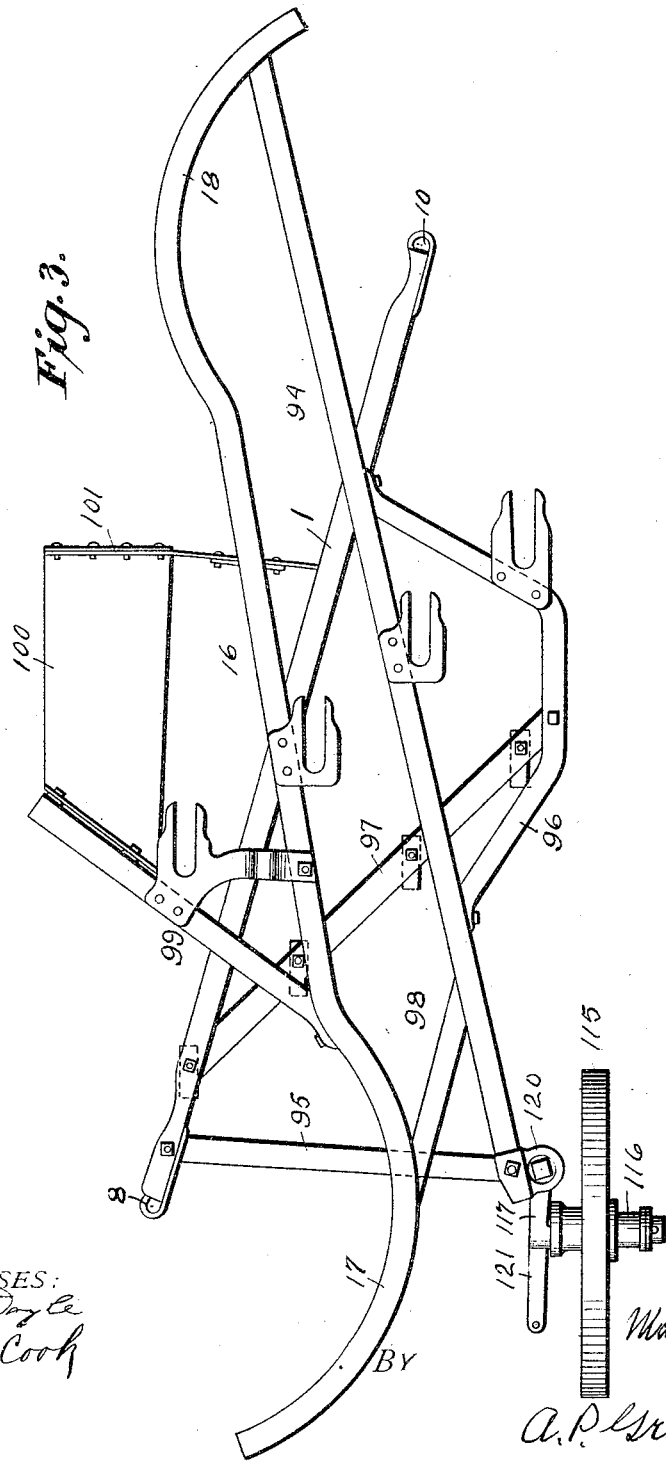

UNITED STATES PATENT OFFICE.

MARTIN R. BRUNER, OF WAPAKONETA, OHIO.

TRACTION DEVICE.

1,123,238. Specification of Letters Patent. Patented Jan. 5, 1915.

Application filed August 16, 1911. Serial No. 644,468.

*To all whom it may concern:*

Be it known that I, MARTIN R. BRUNER, a citizen of the United States, residing at Wapakoneta, in the county of Auglaize, State of Ohio, have invented certain new and useful Improvements in Traction Devices, of which the following is a description, reference being had to the accompanying drawings, forming a part hereof.

My invention relates to traction devices particularly intended for plowing, and has for its object to provide a device capable of being operated to plow a field without crushing down any of the earth previously turned up or that turned up in the plowing operation, which will be comparatively inexpensive to construct and operate, and will be effective in operation, and which will be so constructed that the motive power may be disconnected from the traction wheels and be used to drive threshing or other machinery.

With these and other objects hereinafter set forth in view, my invention consists in the construction and combination of elements hereinafter described and claimed.

Figure 1:
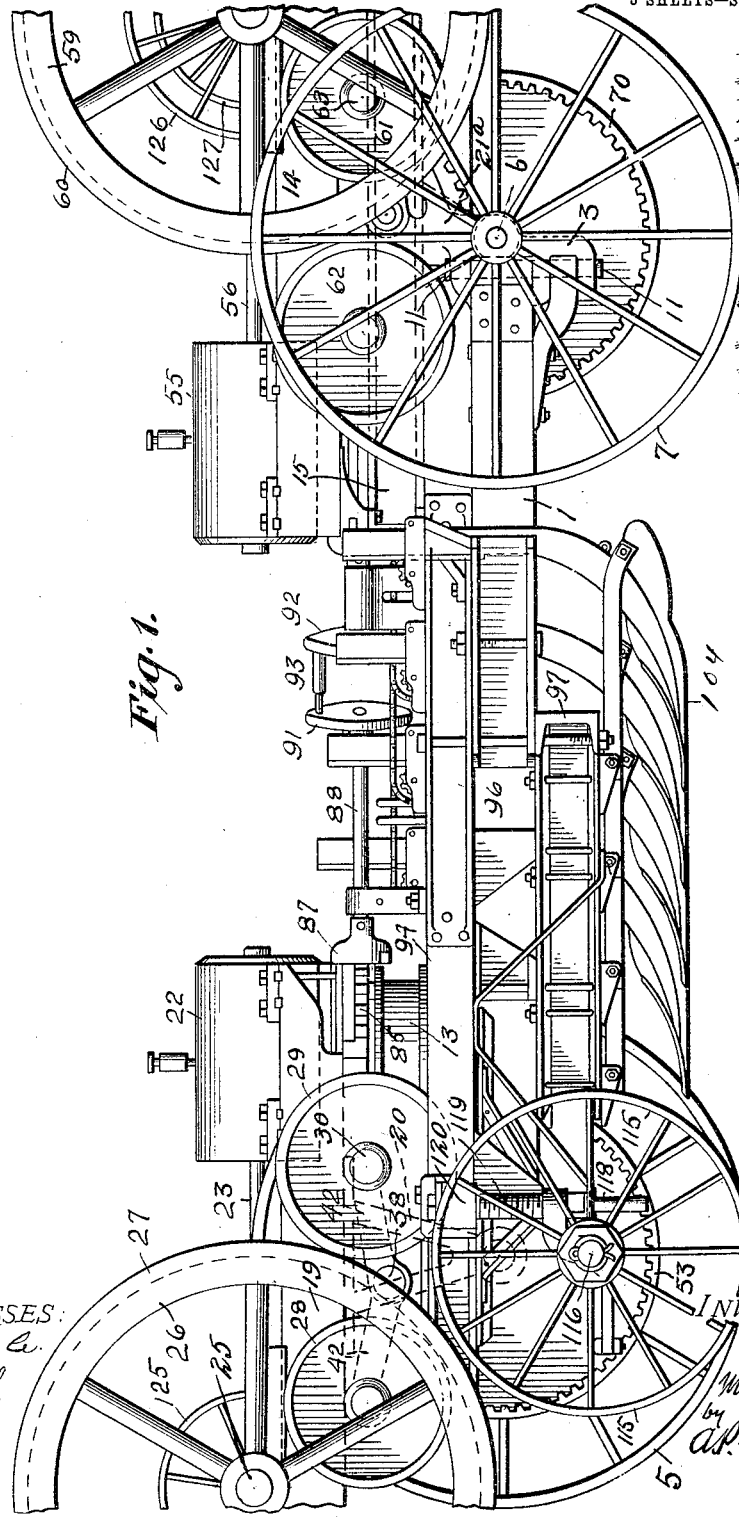
Figure 2:
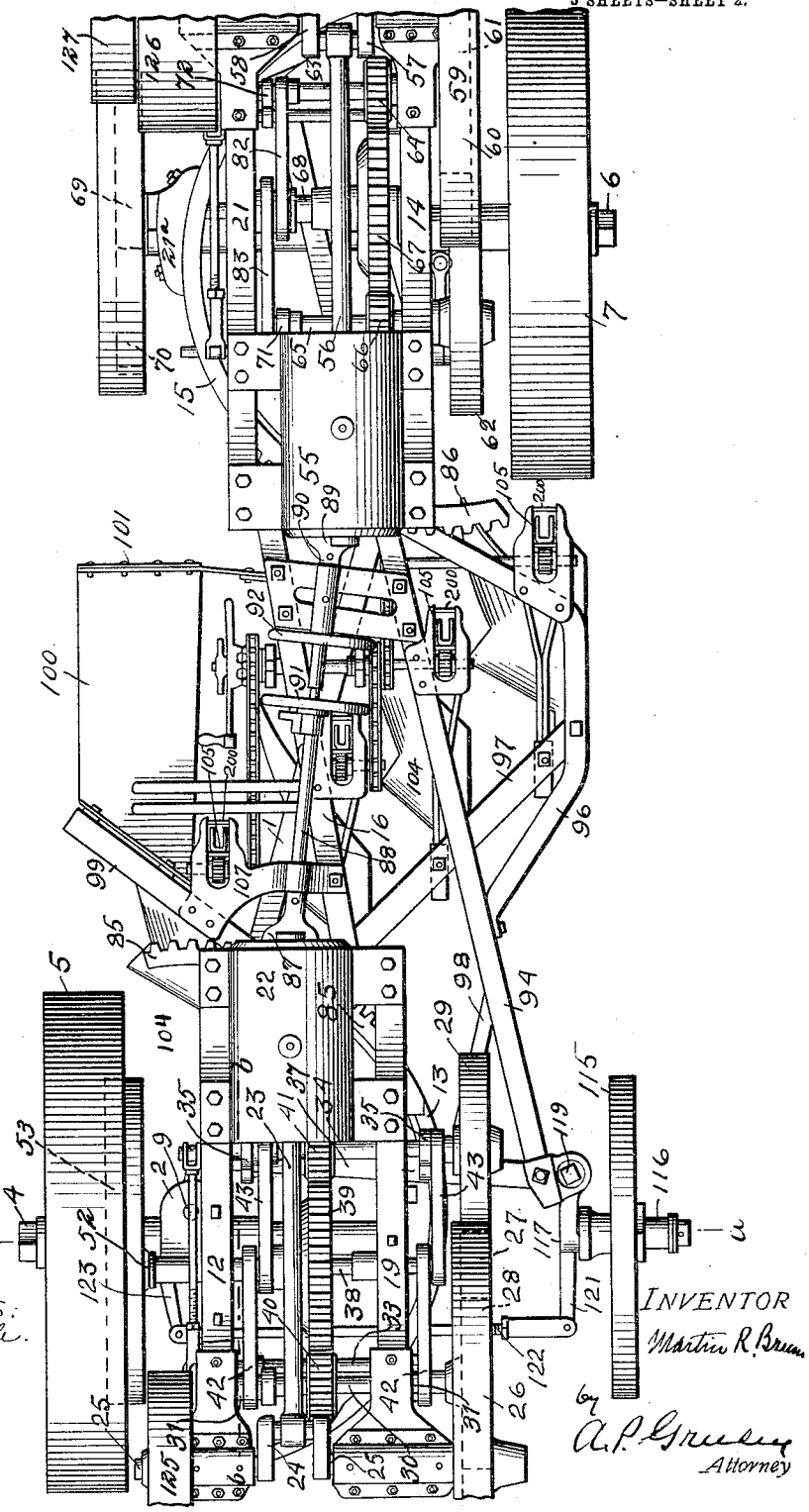

Referring to the drawings, Figure 1 is a side view of a machine embodying my invention, taken from the left-hand side of the machine. Fig. 2 is a top plan view of the machine. Fig. 3 is a plan view of the framework of the central part of the machine.

In the drawings 1 is a horizontal bar which forms the main support of the frame. This main supporting bar is supported at its ends in brackets 2 and 3, which form a part respectively of the front and rear frames. Each of these brackets is provided with a bearing for an axle.

On the right hand end of the front axle 4 is journaled a traction wheel 5. The bracket 2 which carries the front axle and is supported by it, is located near the right hand end of the axle which carries the traction wheel 5.

The rear axle 6 is provided on its left hand end with a traction wheel 7, and the bracket 3 which carries this rear axle and is supported by it, is located near the left hand end of the axle close to the traction wheel 7 and forms a bearing for the axle. The supporting bar 1 thus extends diagonally from near the right hand end of the forward axle to near the left hand end of the rear axle. The bar 1 has at its forward end a vertical bearing 8 to receive vertical pivot pin or king bolt 9, by which the forward end of the bar is pivotally secured to the bracket 2, and at its rear end the bar has a similar vertical bearing 10 to receive vertical pivot pin or king bolt 11, by which the rear end of the bar is secured to the bracket 3.

The bracket 2 extends upward above the axle 4, and supports above it a frame bar 12 extending at right angles to the axle 4. Below the ends of this frame bar are secured the ends of a guide bar 13, which is curved on the arc of a circle concentric with the axis of the pivot pin or king bolt 9.

The bracket 3 at the rear of the machine extends upward above the rear axle 6 and supports at its upper end a frame bar 14 extending at right angles to the axle. Below the ends of the frame bar are secured the ends of a guide bar 15, which is curved on the arc of a circle concentric with the axis of the pivot pin or king bolt 11.

Secured to the horizontal bar 1 and crossing it about midway between its ends is a bar 16, having its ends curved to form arcs 17 and 18, having the same curvature as the guide bars 13 and 15 and being adapted to serve as bearings for the guide bars 13 and 15 respectively, on which they rest and swing.

Parallel with the frame bar 12 and in the same horizontal plane is a horizontal frame bar 19.

To the under side of the frame bar 19 is secured a bracket 20, in the lower end of which is journaled the left hand end of the front axle 4.

Secured to the guide bar 15 in line with the bracket 3 is a depending bracket 3', having in its lower end a bearing for the rear axle 6 near its right hand end.

Supported on the guide bar 15 parallel with the frame bar 14 is a frame bar 21$^a$.

The frame bars 12 and 19 at the front of the machine form the bed for an engine, preferably of the explosive type, having cylinder 22, piston rod 23, crank 24, crank shaft 25, and fly wheel 26, the crank shaft being journaled in suitable bearings carried by the frame bars 12 and 19.

The fly wheel 26 has a flange 27, against the inner face of which a gear wheel, preferably a friction gear wheel, 28 may be brought in contact. Against the outer face of this flange 27 a gear wheel 29, also preferably a friction gear wheel, may be brought in contact. The two gear wheels 28 and 29 are normally out of contact with the flange 27. The gear 28 is carried on a shaft 30, which is journaled near its ends in arms 31, which are pivotally mounted on a rock shaft 33. The gear 29 is carried on shaft 34, which is journaled near its ends in arms 35, which are pivotally mounted on a rock shaft 37.

Between the two shafts 30 and 34 and parallel with them, is a shaft 38 carrying a toothed gear 39, and the shafts 30 and 34 carry respectively toothed pinions 40 and 41 which are in mesh with the gear 39. The shafts 30 and 34 are free to be moved up and down by the rocking of the rock shafts 33 and 37, but their pinions 40 and 41 are held in engagement with the gear 39 by means of arms 42 and 43, which are journaled at one end on the shaft 38 and at their other ends are journaled on the shafts 30 and 34 respectively.

By operating the friction gears 28 and 29 up or down, as the gear 29 is swung up it will be in driving contact with the outer face of the flange 27, the gear 28 being free, while if the gears are swung down the gear 28 will be in driving contact with the inner face of the flange, the gear 29 being free. When the gears are midway between their upper and lower positions neither will be in driving contact with the flange.

On the right hand end of the shaft 38 is a toothed pinion 52, which is in mesh with an internal gear 53, which is secured to the traction wheel 5.

At the rear end of the machine the parallel frame bars 14 and 21 form the bed for an engine corresponding to the engine on the front of the machine, and having cylinder 55, piston rod 56, crank 57 on crank shaft 58, which is journaled in bearings on the frame bars 14 and 21.

Crank shaft 58 carries on its left hand end a fly wheel 59 having flange 60, with the inner surface of which friction gear 61 is adapted to be brought in driving contact, while friction gear 62 is adapted to be brought in driving contact with its outer faces.

Friction gear 61 is mounted on shaft 63, which carries toothed pinion 64, and friction gear 62 is mounted on shaft 65 carrying toothed pinion 66.

Toothed pinions 64 and 66 are in mesh with gear wheel 67 on shaft 68, which carries at its right hand end a toothed pinion 69, which is in mesh with the teeth of internal gear 70 on the right hand end of the rear axle 6, said internal gear wheel 70 having an external tread surface, the function of which will appear later.

The shafts 63 and 65 are connected by arms 82 and 83 to the shaft 68, the arrangement being substantially the same as on the front end of the machine.

The guide bars 13 and 14 carry respectively rack bars 85 and 86. The teeth of rack bar 85 are engaged by the spiral of a snail 87 carried on the end of a shaft 88, and the teeth of rack bar 86 are engaged by the spiral of a snail 89 on shaft 90. The shafts 88 and 90 extend diagonally over the central frame of the machine, and are provided on their ends with hand wheels 91 and 92 respectively, which are connected for operation by a handle 93. By rotating the wheels 91 and 92, the shafts 88 and 90 are caused to rotate the snails 87 and 89, which by their engagement with the rack bars 85 and 86 swing the front and rear parts of the machine on their pivot pins or king bolts.

Above the horizontal bar 1 of the main frame is a horizontal bar 94, which extends nearly parallel with the bar 16, and is secured at its rear end to the curved portion 18, and at its forward end is secured to the end of a cross bar 95, the other end of which is secured to the horizontal bar 1 near its forward end. To the outer side of this bar 94 are secured the ends of a bar 96, which extends outward from its forward end, is then bent rearward and then bent inward and secured to bar 94 at its rear end.

A diagonal bar 97 extends from near the forward end of horizontal bar 1 to the middle portion of bar 96.

A brace bar 98 connects the curved portion 17 of the bar 16 with the bar 94, and a brace bar 99 extends outward from the forward end of the straight portion of the bar 16, and from the outer portion of this brace bar 99 is supported the front end of a platform 100 for the operator, this platform being supported at its rear end by a bracket 101 secured to the bars 1 and 16.

The peripheral face of integral gear wheel 70 on the right hand end of the rear axle 6 will travel on top of the furrow turned by the foremost or right hand plow 104, and is therefore made of less diameter than the traction wheel 7.

At the forward part of the machine a supporting wheel 115 is provided opposite the traction wheel 5. This supporting wheel is mounted to rotate on a stub axle 116 carried by a bracket 117, which at its rear end is journaled on a vertical pin 118, which extends through the end of the cross bar 95 upward through the bracket 117 into a hollow externally screw-threaded rod 119, the screw threads of which engage the internal screw threads of a socket 120 secured to the forward end of the bar 94, the rod 119 being provided at its upper end with a squared projection by which it may be rotated to raise or lower the bracket 117, against which its lower end bears.

The crank shaft 25 is provided on its right hand end with a pulley 125, and the crank shaft 58 is provided on its right hand end with a broad faced pulley 126 and a second pulley 127 of the same diameter as the pulley 125 on crank 25. When the machine is not being used for plowing, the front end of the machine may be swung slightly to the right and the rear end swung to the left, to bring the pulleys 125 and 127 in line and these two pulleys connected by a belt. By then connecting the pulley 126 with a threshing or other machine, the power of the two engines may be utilized as a stationary engine to operate the threshing machine or other machine.

The machine is so constructed that the weight will be borne by the two traction wheels running in furrows, and the forward wheel 115 running on the unbroken ground, so that the tread of wheel 70 will hardly touch the top of the ground turned over by the right hand plow 104. It is, however, desirable to have this wheel of such size as to serve as a guard to prevent the machine from tipping over, if for any reason it should be caused to tip to the right.

It will, of course, be understood that I do not desire to be limited to the precise construction or arrangement of parts, as it is obvious that the form and construction of the parts and the details of construction may be varied without departing from the spirit of the invention.

Having thus described my invention, what I claim is:

1. In a traction device a front traction wheel, a frame supported thereby, a rear traction wheel, a frame supported thereby, a center frame pivotally connected to the front frame, a guide bar on the front frame curved on an arc concentric with the pivot of the center frame, the center frame comprising a horizontal bar having its end curved on an arm corresponding to the arc of the guide bar of the front frame and adapted to bear against it.

2. In a traction device a front traction wheel, a frame supported thereby, a rear traction wheel, a frame supported thereby, a center frame pivotally connected to the front and rear frames, guide bars on the front and rear frames curved on an arc concentric with the pivots of the center frame, the center frame comprising a horizontal bar having its ends curved on an arc corresponding to the arc of the guide bars and adapted to bear against the curved bars on the front and rear frames.

This specification signed and witnessed this 27th day of June A. D. 1911.

MARTIN R. BRUNER.

In the presence of—
CHAS. E. RIORDEN,
A. P. GREELEY.

Copies of this patent may be obtained for five cents each, by addressing the "Commissioner of Patents, Washington, D. C."